United States Patent [19]
Eamon et al.

[11] Patent Number: 5,820,653
[45] Date of Patent: *Oct. 13, 1998

[54] PROCESS FOR MAKING SHAPED COPPER ARTICLES

[75] Inventors: Michael A. Eamon, Tuscon, Ariz.; Robert J. Fedor, Westlake, Ohio; Sharon K. Young; Susan S. Enos, both of Tucson, Ariz.; Wendy M. Gort, Winkelman, Ariz.; Roger N. Wright, Rexford, N.Y.; Stephen J. Kohut, Chandler, Ariz.

[73] Assignee: ElectroCopper Products Limited, Mesa, Ariz.

[*] Notice: The term of this patent shall not extend beyond the expiration date of Pat. No. 5,516,048.

[21] Appl. No.: 634,432

[22] Filed: Apr. 18, 1996

Related U.S. Application Data

[63] Continuation-in-part of Ser. No. 329,235, Oct. 26, 1994, Pat. No. 5,516,408, which is a continuation-in-part of Ser. No. 49,176, Apr. 19, 1993, Pat. No. 5,366,612, and a continuation-in-part of Ser. No. 287,703, Aug. 9, 1994, Pat. No. 5,458,746, which is a continuation of Ser. No. 49,160, Apr. 19, 1993, abandoned.

[51] Int. Cl.[6] ........................................ C25C 1/12
[52] U.S. Cl. ................ 75/743; 75/718; 75/731; 75/753; 205/574; 205/580; 205/583; 414/14; 414/20; 414/11; 414/67; 423/24
[58] Field of Search .............................. 75/718, 731, 753; 205/574, 580, 583; 414/14, 20, 41, 67; 423/24

[56] References Cited

U.S. PATENT DOCUMENTS

| | | | |
|---|---|---|---|
| 1,959,376 | 5/1934 | Lucas | 264/1 |
| 2,053,222 | 9/1936 | Lucas | 204/5 |
| 3,148,130 | 9/1964 | Brace et al. | 204/96 |
| 3,163,591 | 12/1964 | Chambers | 204/108 |

(List continued on next page.)

FOREIGN PATENT DOCUMENTS

| | | | |
|---|---|---|---|
| 496513 | 1/1992 | European Pat. Off. | C08F 8/00 |
| 1021087 | 2/1966 | United Kingdom . | |

OTHER PUBLICATIONS

Argall, "Copper Oxide to Copper Cathode", *World Mining*, Aug., 1976, pp. 48–51.

Eamon et al, "Plant Practices & Inovations", TMS Symposium, New Orleans, Louisiana, Feb. 1991, pp. 1–17.

(List continued on next page.)

*Primary Examiner*—David A. Simmons
*Assistant Examiner*—M. Alexandra Elve
*Attorney, Agent, or Firm*—Michael A. Centanni

[57] ABSTRACT

This invention relates to a process for making a shaped copper article directly from a copper-bearing material, comprising: (A) contacting said copper-bearing material with an effective amount of at least one aqueous leaching solution to dissolve copper ions into said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; (E) separating said copper-rich stripping solution from said copper-depleted extractant; (F) flowing said copper-rich stripping solution between an anode and a cathode, and applying an effective amount of voltage across said anode and said cathode to deposit copper powder on said cathode; (G) removing said copper powder from said cathode; and (H) extruding, forging or molding said copper powder to form said shaped copper article.

32 Claims, 4 Drawing Sheets

U.S. PATENT DOCUMENTS

| | | | |
|---|---|---|---|
| 3,282,682 | 11/1966 | Harlan | 75/117 |
| 3,535,218 | 10/1970 | Brown et al. | 204/108 |
| 3,616,277 | 10/1971 | Adamson | 204/10 |
| 3,661,740 | 5/1972 | Brace et al. | 204/96 |
| 3,681,056 | 8/1972 | Lyon et al. | 75/108 |
| 3,844,763 | 10/1974 | Burkin | 75/0.5 A |
| 3,880,647 | 4/1975 | Tipman | 75/0.5 A |
| 3,925,472 | 12/1975 | Swanson | 260/566 A |
| 3,951,649 | 4/1976 | Kieswetter, Jr. et al. | 75/117 |
| 4,023,964 | 5/1977 | DeMarthe et al. | 75/101 R |
| 4,028,199 | 6/1977 | Holland | 204/10 |
| 4,030,990 | 6/1977 | Piret et al. | 204/108 |
| 4,033,765 | 7/1977 | Gerlach | 75/108 |
| 4,039,404 | 8/1977 | Richards et al. | 204/106 |
| 4,043,882 | 8/1977 | Skarbo et al. | 204/106 |
| 4,065,300 | 12/1977 | Poarch | 75/117 |
| 4,069,119 | 1/1978 | Wong | 204/106 |
| 4,070,183 | 1/1978 | Parker et al. | 75/117 |
| 4,133,746 | 1/1979 | Dopson | 209/1 |
| 4,142,952 | 3/1979 | Dalton | 204/106 |
| 4,150,976 | 4/1979 | Dain | 75/117 |
| 4,177,113 | 12/1979 | Seibt | 204/12 |
| 4,217,417 | 8/1980 | Smith | 435/180 |
| 4,225,677 | 9/1980 | Boutier et al. | 521/31 |
| 4,440,572 | 4/1984 | Nadkarni et al. | 75/232 |
| 4,484,990 | 11/1984 | Bultman et al. | 204/106 |
| 4,544,460 | 10/1985 | Ochs | 204/107 |
| 4,552,632 | 11/1985 | Andersen et al. | 204/107 |
| 4,561,887 | 12/1985 | Domic et al. | 75/65 R |
| 4,666,513 | 5/1987 | Gautier et al. | 75/117 |
| 4,874,534 | 10/1989 | Sorensen et al. | 210/803 |
| 4,923,686 | 5/1990 | Dalton et al. | 423/38 |
| 4,957,714 | 9/1990 | Olafson et al. | 423/24 |
| 5,366,612 | 11/1994 | Clouser et al. | 205/73 |
| 5,458,746 | 10/1995 | Burgess et al. | 204/106 |
| 5,516,408 | 5/1996 | Peckham et al. | 205/580 |
| 5,567,382 | 10/1996 | Daniela | 419/19 |

OTHER PUBLICATIONS

Enchev et al, "Production of Copper Powder by the Method of Electrolytic Extraction Using a Reversing Current", *Sov. Powder Met. & Met. Ceramics*, v. 13, No. 9 (Sep. 1974), Translation by Plenum Publishing Corp. (1975), pp. 764–766.

Harper et al, "The Electrodeposition of Copper Powder With the Aid of Surfactants", Refinery and Mill Operations—Part I, CDA–ASM Conference, Oct., 1972, Cleveland, Ohio.

Klar, "Production of Copper Powder by the Reduction of Copper Oxide", Metals Handbook, Ninth Edition, vol. 7, pp. 105–120.

Kordosky, "Copper Solvent Extraction: The State of the Art", JOM, May, 1992, pp. 40–45.

Magma Copper Company, Pamphlet entitled "SX–EW/Solvent Extraction–Electrowinning".

Singh et al, "A Continuous & Self Regulating Method for Making Copper Powder by Electrolysis", *NML Technical Journal*, vol. 17, Feb.–May 1975, pp. 23–26.

Taubenblat, "Electrodeposition of Metal Powders", *Metals Handbook Ninth Edition*, vol. 7, pp. 71–72.

Townson et al, "The Solvent Extraction of Copper–a Perspective", Reprinted for *Mining Journal Limited*, London.

Usol'tseva et al, "Electrodeposition of Fine Copper Powders in the Presence of Organic Addition", Plenum Publishing Corporation, (1984), pp. 610–613, Translation from Poroshkovaya Metallurygiya, No. 8 (248) pp. 16–20, Aug., 1983.

Walker et al, "The Morphology and Properties of Electrodeposited Copper Powder", *Surface Technology*, 23 (1984) pp. 301–321.

Walker et al, "The Stabilization of Electrodeposited Copper Powder", *Surface and Coatings Technology*, 27 (1986) pp. 137–144.

Williams, "Copper Powder Production at Nordduetsche Affinerie", *MPR*, Jan., 1989.

"The Economics of Pressing Grade Copper Powder Production", *MPR*, May, 1984, pp. 251–255.

"Non–Ferrous Powder Production at Makin", *MPR*, Jan., 1987, pp. 15–20.

B.B. Moreton, "Orientating Copper Technology and Product Innovation Towards Changing Market Needs", International Copper Research Association, Inc., Potters Bar. Herts., U.K., pp. 200–203.

Lyman, "The Impact of Technology on Future Copper Markets in the U.S.A.", Copper Development Assoication Inc., Greenwich, CT., U.S.A., pp. 192–199.

Litvishko et al, "Effects of a Pulsating Electric Current on the Physicomechanical Properties of Copper Powder", p. 523–526. Volgograd Institute of Municipal Engineers. Translated from Poroshkovaya Metallurgiya, No. 7 (139), pp. 1–5, Jul. 1974.

Ramakrishna et al, "Copper Powder Production Techniques–State of Knowledge and Development Trends", *PMAI Newsletter* vol. 10, No. 2, 1984.

Bandopadhyay et al, "Production of Copper Powder from Indian Chalcopyrite Ore". Fourth Annual Technical Conference of the PMAI on Feb. 6–7, 1978.

Balakina et al, "Effect of Oleic Acid Concentration and Cathode Revolution Speed on the Electrodeposition of Copper Powder in a Two–Layer Bath", 1984 Plenum Publishing Corporation, pp. 967–971. Institute of Colloid Chemistry and the Chemistry of Water, Academy of Sciences of the Ukrainian SSR. Translated from Poroshkovaya Metallurgiya, No. 12 (252), pp. 4–8, Dec., 1983.

F. Molnar, "Effect of Chloride Ions on Properties of Copper Powder Precipitated by Electrolysis", Banyasz, Kohasz, Lapok (Kohasz), 1985 (4) pp. 173–177.

K.I. Popov et al, "Formation of Powdered Copper Deposits by Constant and Pulsating Overpotential Electrolysis", 1977 Chapman and Hall Ltd. *Journal of Applied Electrochemistry* 7 (1977), pp. 77–80.

K.I. Popov et al, "The Comparison of Galvanostatic and Potentiostatic Copper Powder Deposition on Platinum and Aluminum Electrodes", 1978 Chapman and Hall Ltd. *Journal of Applied Electrochemistry 8* (1978), pp. 503–514.

Kirk–Othmer, "Ion Exchange", *Concise Encyclopedia of Chemical Technology*, John Wiley & Sons, 1985, pp. 665–666.

M. Metodiev et al, "Production of Fine Copper Powder with Controllable Grain–Size Distribution", PMI vol. 23, No. 2, 1991.

G.A. Mowbray, "A Critical Review of Production Methods for Powders of Copper and Copper Alloys, and Their Effect on the Consumer", 1985 PM Group Meeting (Oct. 21–23, 1985).

A.V. Pomosov et al, "Role of a Polyvinyl Alcohol Addition in the Production of Copper Powder by Electrolysis", pp. 353–356. S.M. Kirov Ural Polytechnic Institute. Translated from Poroshkovaya Metallurgiya, No. 6 (198), pp. 1–5, Jun., 1979.

S.S. Naboichenko, "Copper Powder Production: Present State and Perspectives", 1983 Plenum Publishing Corporation, pp. 843–846. Ural Polytechnic Institute. Translated from Poroshkovaya Metallurgiya, No. 11 (239), pp. 17–21, Nov., 1982.

I.B. Murashova et al, "Electrodeposition of Finely Divided Copper Under Conditions of a Linearly Increasing Current", 1987 Plenum Publishing Corporation, pp. 792–797. Ural Polytechnic Institute. Translated from Poroshkovaya Meytallurgiya, No. 10 (286), pp. 8–14, Oct., 1986.

E.E. Usol'tseva et al, "Production of Electrolytic Copper Powders on Rod Electrodes with Separating Layers", 1988 Plenum Publishing Corporation, pp. 870–872. Ural Polytechnic Institute. Translated from Poroshkovaya Metallurgiya, No. 11 (299), pp. 4–8, Nov., 1987.

R. Walker et al, "The Stabilization of Electrodeposited Copper Powder", *Surface and Coatings Technology*, 27 (1986) 137–144.

Rohm and Haas Company, Product Literature for "Amberlite Ion Exchange Resins", 1978.

Stankovic et al, "The Continuous Production of Copper Powder in an Electro–Chemical Reactor with Tangential Inlet of Electrolyte", Verlag Chemie GmbH, D–6940 Weinheim, 1982, pp. 254–256.

B.N. Smirnov et al, "Selection of Electrolyte Circulation Speed in the Production of Copper Powder", Sov J. Non–Ferrous Met. 25 (9) Sep. 1984, pp. 26–27.

M.A. Clegg et al, "Recent Developments in the Production and Applications of Metal and Composite Powders", Horizons of Powder Metallurgy (Prac. 1986 Intl. Powder Meeting Conference & Exhibition: The Future of Powder Metallurgy) P/M '86 v. 1, pp. 175–178.

E.J. Chupungco et al, A New Chemical Process for the Production of High Purity Copper Powder from Copper sulfate or Copper Nitrate Solutions, *Powder Metallurgy International* vol. 14, No. 4, 1982, pp. 205–206.

PCT/US96/18352, PCT International Search Report mailed Feb. 28, 1997.

PROCESS FOR MAKING SHAPED COPPER ARTICLES

This application is a continuation-in-part of U.S. application Ser. No. 329,235, filed Oct. 26, 1994 (now U.S. Pat. No. 5,516,408); which was a continuation-in-part of Ser. No. 49,176, filed Apr. 19, 1993 (now U.S. Pat. No. 5,366,612), and a continuation-in-part of Ser. No. 287,703 filed Aug. 9, 1994 (now U.S. Pat. No. 5,458,746) which was a continuation of Ser. No. 49,160, filed Apr. 19, 1993 (now abandoned). The disclosures in these prior applications are incorporated herein by reference in their entirety.

TECHNICAL FIELD

This invention relates to a process for making shaped copper articles. More particularly, this invention relates to a process for making shaped copper articles directly from an impure copper source such as copper ore or copper-containing waste.

BACKGROUND OF THE INVENTION

The process for recovery of copper metal values from ores and processing liquids by solvent extraction-electrowinning (hereinafter sometimes referred to as "SX-EW") is well-known. Briefly, the process is carried out using a copper-bearing aqueous solution which is obtained by dissolving (generally from an ore) the copper in an aqueous leach liquor, or by using a copper-bearing solution such as process effluent. The resulting solution of copper values is mixed with a water-immiscible organic solvent (e.g., kerosene) containing a water-insoluble ion exchange composition having selective affinity for the copper values. The ion exchange composition preferentially extracts the copper values from the aqueous solution. The aqueous and organic phases are separated. The aqueous solution, now copper-depleted, is usually referred to as a "raffinate." The raffinate can be recycled as leach liquor (in a leaching process) or discarded (in a process such as recovery of copper from process effluent). The organic phase (which contains ion exchange composition and the extracted copper values) is usually referred to as "loaded organic." The desired copper values are removed from the loaded organic by mixing with an aqueous strip solution containing strong acid (e.g., sulfuric, phosphoric or perchloric acid) and having a lower pH than the above copper-bearing aqueous solution. The aqueous strip solution extracts the desired copper values from the loaded organic. The organic and aqueous phases are separated, and the desired copper values are present in the aqueous strip solution. The resulting copper-rich aqueous strip solution is sometimes referred to as an "electrolyte" or "rich electrolyte." The copper-depleted organic phase is usually referred to as a "barren organic." The barren organic can be recycled. Copper is recovered in purified form from the electrolyte by a technique known as "electrowinning" (hereafter sometimes referred to as "EW"). The electrowinning process typically involves plating the copper on copper starting sheets or stainless steel cathode mother blanks. The plating cycle usually takes about seven days to obtain a 100-pound cathode from each side of the mother blank. The cathodes are stripped mechanically from each side of the mother blank. The resulting copper product is sometimes referred to as "cathodic copper."

The production of copper powder by electrodeposition involves the use of an electrolytic cell containing an anode, a cathode, an electrolyte solution containing copper ions and sulfate ions, and a source of current. Through the application of voltage between the anode and the cathode the deposition of copper powder is effected on the cathode surface. The powder is then removed at timed intervals or in a continuous fashion. The process begins with the copper feed stock which is dissolved in sulfuric acid to form the electrolyte solution. Relatively pure electrolytes are required so that the copper powder is of sufficient purity for normal commercial purposes such as friction materials, bearings, alloying additives, powder metallurgy, etc. Copper removed from the electrolyte by the electrolytic production of copper powder is typically continuously replenished in order to maintain the concentration of the copper ions in solution. The purity of the electrolyte and the replacement of copper removed from the electrolyte is maintained by the use of relatively pure copper soluble anodes. The copper used for the anodes has been previously purified by electrolytic means to remove undesired contaminants. The electrolytically purified copper is typically recast into an anode shape suitable for powder production. An alternative method involves the use of electrolytically purified copper rods, approximately one-half inch in diameter cut into one inch lengths and called copper shot, which are then placed in an insoluble wire mesh anode basket.

The electrolytically purified copper feedstocks used in prior art electrodeposition processes for making copper powder are often produced using SX-EW techniques of the type discussed above. They are also made using traditional smelting and refining techniques. The prior art electrodeposition processes for making copper powder, which involve initially dissolving the copper feedstock in a digester to form copper ions, are slow, difficult to control, and require large quantities of expensive pure copper inventoried in the digester.

By virtue of the inventive process, shaped copper articles are produced in a simplified and less costly manner when compared to the prior art. The inventive process utilizes a copper source that does not require in its production the additional steps of electrowinning, drawing, etc., which are used in making the electrolytically purified copper feedstocks (e.g., copper shot, copper wire, copper oxide, recycled copper, etc.) used in the prior art. Unexpectedly, impurities carried from the extraction steps used in the inventive process to the electrolyte solution used to make the copper powder do not degrade the performance characteristics of the copper articles.

U.S. Pat. No. 5,458,746 discloses a process for making copper metal powder from copper-bearing material, comprising: (A) contacting said copper-bearing material with an effective amount of at least one aqueous leaching solution to dissolve copper ions in said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution, said extractant comprising (i) at least one oxime characterized by a hydrocarbon linkage with at least one —OH group and at least one =NOH group attached to different carbon atoms on said hydrocarbon linkage, (ii) at least one betadiketone, or (iii) at least one ion-exchange resin; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; (E) separating said copper-rich stripping solution from said copper-depleted extractant to form an electrolyte solution; (F) advancing said electrolyte solution to an electrolytic cell equipped with at least one anode and at least one cathode, and applying an effective amount of voltage across said anode and said cathode to deposit copper metal powder on said cathode; and (G) removing copper metal powder from said cathode.

SUMMARY OF THE INVENTION

This invention relates to a process for making a shaped copper article directly from a copper-bearing material, comprising: (A) contacting said copper-bearing material with an effective amount of at least one aqueous leaching solution to dissolve copper ions into said leaching solution and form a copper-rich aqueous leaching solution; (B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution; (C) separating said copper-rich extractant from said copper-depleted aqueous leaching solution; (D) contacting said copper-rich extractant with an effective amount of at least one aqueous stripping solution to transfer copper ions from said extractant to said stripping solution to form a copper-rich stripping solution and a copper-depleted extractant; (E) separating said copper-rich stripping solution from said copper-depleted extractant; (F) flowing said copper-rich stripping solution between an anode and a cathode, and applying an effective amount of voltage across said anode and said cathode to deposit copper powder on said cathode; (G) removing said copper powder from said cathode; and (H) extruding, forging or molding said copper powder to form said shaped copper article.

A significant advantage of this invention is that copper articles are produced from a copper source such as copper ore. It is not necessary to first make cathodic copper and then melt, cast and roll it as required by the prior art.

DESCRIPTION OF THE PREFERRED EMBODIMENTS

The copper-bearing material can be any source of copper from which copper can be extracted. These sources include copper ore, smelter flue dust, copper cement, copper concentrates, copper smelter products, copper sulfate, and copper-containing waste. The term "copper-containing waste" refers to any solid or liquid waste material (e.g., garbage, sludge, effluent streams, etc.) that contains copper. These waste materials include hazardous wastes. Specific examples of wastes that can be used are copper oxides obtained from treating spent cupric chloride etchants. Also, copper sources used in the prior art such as copper shot, copper wire, recycled copper, etc., can be used, but the economic advantages of using the inventive process are reduced when such prior art sources are used.

In one embodiment copper ore from an open pit mine is used as the copper-bearing material. The ore is hauled to a heap-leaching dump which is typically built on an area underlain with a liner, such as a thick high-density polyethylene liner, to prevent loss of leaching fluids into the surrounding water shed. A typical heap-leaching dump has a surface area of, for example, about 125,000 square feet and contains approximately 110,000 tons of ore. As leaching progresses and new dumps are built on top of the old dumps, they become increasingly higher and eventually reach heights of, for example, about 250 feet or more. A network of pipes and wobbler sprinklers is laid on the surface of a newly completed dump and a weak solution of sulfuric acid is continuously sprayed at a rate of, for example, about 0.8 gallon per minute per 100 square feet of surface area. The leaching solution percolates down through the dump, dissolves copper in the ore, flows from the dump base as a copper-rich aqueous leach solution, drains into a collection pond, and is pumped to a feed pond for subsequent treatment using the inventive process.

With some mining operations in-situ leaching is used to extract copper values from copper ore. The copper-rich leach solution obtained by this process can be used in the inventive process as the copper-bearing material. In-situ leaching is useful when reserves of acid-soluble oxide ore lie beneath an open pit area and above the depleted portion of an underground mine or when a deposit is buried too deeply to be economically developed by open pit methods. Injection wells are drilled into this zone at a depth of, for example, about 1000 feet. The wells are cased with polyvinylchloride pipe, the bottom portion of which is slotted to allow solution into the ore. A leach solution of weak sulfuric acid is injected into each well at a rate dependent upon the permeability of the zone into which it is drilled. The solution percolates down through the ore zone, dissolves the copper minerals, and drains into a prepared collection area. The collection area can be, for example, haulage drifts of the underground mine. The copper-bearing aqueous leach solution that is produced is pumped to the surface by means of a corrosion-resistant pumping system where it is available for use as the copper-bearing material for the inventive process.

In mining operations wherein both leach dumps and in-situ leaching are employed, the copper-bearing leach solution (sometimes referred to as a pregnant leach solution) from each can be combined and used as the copper-bearing material in the inventive process.

The aqueous leaching solution used in (A) of the inventive process is preferably a sulfuric acid solution, halide acid solution (HCl, HF, HBr, etc.) or an ammonia solution. The sulfuric or halide acid solution generally has a sulfuric or halide acid concentration in the range of about 5 to about 50 grams per liter, and in one embodiment about 5 to about 40 grams per liter, and in one embodiment about 10 to about 30 grams per liter.

The ammonia solution generally has an ammonia concentration in the range of about 20 to about 140 grams per liter, and in one embodiment about 30 to about 90 grams per liter. The pH of this solution is generally in the range of about 7 to about 11, and in one embodiment about 8 to about 9.

The copper-rich aqueous leaching solution or pregnant leaching solution formed during (A) generally has a copper ion concentration in the range of about 0.8 to about 5 grams per liter, and in one embodiment about 1 to about 3 grams per liter. When the leaching solution used in (A) is a sulfuric acid solution, the concentration of free sulfuric acid in the copper-rich aqueous leaching solution is generally from about 5 to about 30 grams per liter, and in one embodiment about 10 to about 20 grams per liter. When the leaching solution used in (A) is an ammonia solution, the concentration of free ammonia in the copper-rich aqueous leaching solution is generally from about 10 to about 130 grams per liter, and in one embodiment about 30 to about 90 grams per liter.

The water-insoluble extractant used in (B) of the inventive process can be any water-insoluble extractant capable of extracting copper ions from an aqueous medium. In one embodiment the extractant is dissolved in a water-immiscible organic solvent. (The terms "water-immiscible" and "water-insoluble" refer to compositions that are not soluble in water above a level of about 1 gram per liter at 25° C.) The solvent can be any water-immiscible solvent for the extractant with kerosene, benzene, toluene, xylene, naphthalene, fuel oil, diesel fuel and the like being useful, and with kerosene being preferred. Examples of useful kerosenes are SX-7 and SX-12 which are available from Phillips Petroleum.

In one embodiment the extractant is an organic compound containing at least two functional groups attached to different carbon atoms of a hydrocarbon linkage, one of the functional groups being —OH and the other of said functional groups being =NOH. These compounds can be referred to as oximes.

In one embodiment the extractant is an oxime represented by the formula wherein $R^1$, $R^2$, $R^3$, $R^4$, $R^5$, $R^6$ and $R^7$ are independently hydrogen or hydrocarbyl groups. The hydrocarbyl groups can independently have 1 to about 12 carbon atoms, and in one embodiment 1 to about 6 carbon atoms. In one embodiment, $R^1$ and $R^4$ are each butyl; $R^2$, $R^3$ and $R^6$ are each hydrogen; and $R^5$ and $R^7$ are each ethyl. Compounds with this structure are available from Henkel Corporation under the trade designation LIX 63.

In one embodiment the extractant is an oxime represented by the formula wherein $R^1$ and $R^2$ are independently hydrogen or hydrocarbyl groups. Useful embodiments include those wherein $R_1$ is an alkyl group of about 6 to about 20 carbon atoms, and in one embodiment about 9 to about 12 carbon atoms; and $R^2$ is hydrogen, an alkyl group of 1 to about 4 carbon atoms, and in one embodiment 1 or 2 carbon atoms, or $R^2$ is phenyl. The phenyl group can be substituted or unsubstituted with the latter being preferred. The following compounds, which are based upon the above-indicated formula, are available from Henkel Corporation under the trade designations indicated below and are useful with the inventive process:

| Trade Designation | $R^1$ | $R^2$ |
|---|---|---|
| LIX 65 | Nonyl | Phenyl |
| LIX 84 | Nonyl | Methyl |
| LIX 860 | Dodecyl | Hydrogen |

Other commercially available materials available from Henkel Corporation that are useful include: LIX 64N (identified as a mixture of LIX 65 and LIX 63); and LIX 864 and LIX 984 (identified as mixtures of LIX 860 and LIX 84).

In one embodiment the extractant is a betadiketone. These compounds can be represented by the formula wherein $R^1$ and $R^2$ are independently alkyl groups or aryl groups. The alkyl groups generally contain 1 to about 10 carbon atoms. The aryl groups are generally phenyl. An example of a commercial extractant available from Henkel Corporation corresponding to the above formula is LIX 54. These betadiketones are useful when the leaching solution used in (A) of the inventive process is an ammonia solution.

The concentration of the extractant in the organic solution is generally in the range of about 2% to about 40% by weight. In one embodiment the organic solution contains from about 5% to about 10%, or about 6% to about 8%, or about 7% by weight of LIX 984, with the remainder being SX-7.

In one embodiment the extractant is an ion-exchange resin. These resins are typically small granular or bead-like materials consisting of two principal parts: a resinous matrix serving as a structural portion, and an ion-active group serving as the functional portion. The functional group is generally selected from those functional groups that are reactive with copper ions. Examples of such functional groups include —$SO_3$—, —COO—, and Useful resin matrixes include the copolymers of styrene and divinylbenzene. Examples of commercially available resins that can be used include IRC-718 (a product of Rohm & Haas identified as a tertiary amine substituted copolymer of styrene and divinylbenzene), IR-200 (a product of Rohm & Haas identified as sulfonated copolymer of styrene and divinylbenzene), IR-120 (a product of Rohm & Haas identified as sulfonated copolymer of styrene and divinylbenzene), XFS 4196 (a product of Dow identified as a macroporous polystyrene/divinylbenzene copolymer to which has been attached N-(2-hydroxyethyl)-picolylamine), and XFS 43084 (a product of Dow identified as a macroporous polystyrene/divinylbenzene copolymer to which has been attached N-(2-hydroxypropyl)-picolylamine). These resins are typically used in the inventive process as fixed beds or moving beds. During (B) of the inventive process, the resin is contacted with the copper-rich aqueous leach solution from (A), the contacting being sufficient to transfer copper ions from the leach solution to the resin. The copper-rich resin is then stripped during (D) to provide a copper-stripped or copper-depleted resin which can be used during (B).

The copper-rich extractant that is separated during (C) of the inventive process typically has a concentration of copper in the range of about 1 to about 6 grams per liter of extractant, and in one embodiment about 2 to about 4 grams per liter of extractant. The copper-depleted aqueous leaching solution that is separated during (C) typically has a copper ion concentration in the range of about 0.01 to about 0.8 grams per liter, and in one embodiment about 0.04 to about 0.2 grams per liter. When the leaching solution used in (A) is a sulfuric acid solution, the concentration of free sulfuric acid in the copper-depleted aqueous leaching solution separated during (C) is generally from about 5 to about 50 grams per liter, and in one embodiment about 5 to about 40 grams per liter, and in one embodiment about 10 to about 30 grams per liter. When the leaching solution used in (A) is an ammonia solution, the concentration of free ammonia in the copper-depleted aqueous leaching solution separated during (C) is generally from about 10 to about 130 grams per liter, and in one embodiment about 30 to about 90 grams per liter.

In one embodiment the contacting and separating steps (B) and (C) of the inventive process are conducted in two stages. In this embodiment, (B-1) and (B-2) are contacting steps and (C-1) and (C-2) are separating steps. Thus, in this embodiment, the inventive process involves the following sequence (A), (B-1), (C-1), (B-2), (C-2), (D), (E), (F), (G) and (H), with process streams from several of these steps being recirculated to other steps in the process. (B-1) involves contacting the copper-rich aqueous leaching solution formed during (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution. (C-1) involves separating the copper-rich extractant formed during (B-1) from the first copper-depleted aqueous leaching solution formed during (B-1). The copper-rich extractant that is separated during (C-1) generally has a concentration of copper in the range of about 1 to about 6 grams per liter of extractant, and in one embodiment about 2 to about 4 grams per liter of extractant. The first copper-depleted aqueous leaching solution that is separated during (C-1) generally has a copper ion concentration in the range of about 0.4 to about 4 grams per liter, and in one embodiment about 0.5 to about 2.4 grams per liter. When the leaching solution used in (A) is a sulfuric acid solution, the concentration of free sulfuric acid in the first copper-depleted aqueous leaching solution separated during (C-1) is generally from about 5 to about 50 grams per liter, and in one embodiment about 5 to about 30 grams per liter, and in one embodiment about 10 to about 30 grams per liter. When the leaching solution used in (A) is an ammonia solution, the concentration of free ammonia in the first copper-depleted aqueous leaching solution separated during (C-1) is generally from about 10 to about 130 grams per liter, and in one embodiment about 30 to about 90 grams per liter.

(B-2) involves contacting the first copper-depleted aqueous leaching solution separated during (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution. (C-2) involves separating the copper-bearing extractant formed during (B-2) from the second copper-depleted aqueous leaching solution formed during (B-2). The copper-bearing extractant that is separated during (C-2) generally has a concentration of copper in the range of about 0.4 to about 4 grams per liter of extractant, and in one embodiment about 1 to about 2.4 grams per liter of extractant. The second copper-depleted aqueous leaching solution that is separated during (C-2) generally has a copper ion concentration in the range of about 0.01 to about 0.8 grams per liter, and in one embodiment about 0.04 to about 0.2 grams per liter. When the leaching solution used in (A) is a sulfuric acid solution, the concentration of free sulfuric acid in the second copper-depleted aqueous leaching solution separated during (C-2) is generally from about 5 to about 50 grams per liter, and in one embodiment about 5 to about 40 grams per liter, and in one embodiment about 10 to about 30 grams per liter. When the leaching solution used in (A) is an ammonia solution, the concentration of free ammonia in the second copper-depleted aqueous leaching solution separated during (C-2) is generally from about 10 to about 130 grams per liter, and in one embodiment about 30 to about 90 grams per liter.

The stripping solution used in (D) of the inventive process is a sulfuric acid solution which has a free sulfuric acid concentration generally in the range of about 80 to about 300 grams per liter, and in one embodiment about 150 to about 250 grams per liter. The copper-rich stripping solution that is formed during (D) has a copper ion concentration generally in the range of about 1 to about 60 grams per liter, and in one embodiment about 5 to about 15 grams per liter; and a free sulfuric acid concentration in the range of about 70 to about 290 grams per liter, and in one embodiment about 140 to about 240 grams per liter.

The electrodeposition steps (F) and (G) of the inventive process involve advancing the copper-rich stripping solution from (E) into an electrolytic or electroforming cell and electrodepositing copper on the cathode of the cell. The copper-rich stripping solution treated in the electrolytic or electroforming cell can be referred to as either a copper-rich stripping solution or an electrolyte solution. In one embodiment, this electrolyte solution is subjected to a purification or filtering process prior to entering the cell. The electric current used in the cell can be direct current or alternating current with a direct current bias. The copper that is deposited on the cathode is in the form of copper powder.

The electrodeposition steps (F) and (G) are conducted in an electrolytic cell equipped with at least one anode and at least one cathode. The cathode can be made of titanium or stainless steel. The anode, in one embodiment, is a dimensionally stable insoluble anode. An example of such an anode is a titanium anode coated with a platinum family metal or metal oxide. The platinum family metals and metal oxides that can be used include Pt, Ir, Ru, Rh, Pd and Os, with Pt and Ir being preferred. These anodes do not contaminate the electrolyte solution and, in one embodiment, their use is essential in providing copper powders of high purity. The flow of the electrolyte solution through the electrolytic cell is sufficient to maintain constant a desired difference in copper ion concentration between electrolyte solution entering the cell and the electrolyte solution leaving the cell. Generally this difference in copper ion concentration is from about 1 to about 10 grams per liter, and in one embodiment about 1 to about 3 grams per liter, with the solution entering the electrolytic cell having a higher concentration of copper ions than the solution leaving the cell. Advantageously, the flow between the anode and the cathode is effected by natural convection. The electrolyte solution generally has a free sulfuric acid concentration in the range of about 70 to about 300 grams per liter, and in one embodiment about 140 to about 250 grams per liter. The temperature of the electrolyte solution in the electrolytic cell is generally in the range of about 20° C. to about 65° C., and in one embodiment 30° C. to about 45° C. The copper ion concentration is generally in the range of about 1 to about 60 grams per liter, and in one embodiment from about 4 to about 15 grams per liter. The free chloride ion concentration is generally up to about 300 ppm, and in one embodiment up to about 150 ppm, and in one embodiment up to about 100 ppm. In one embodiment, the free chloride ion concentration is up to about 20 ppm, and in one embodiment up to about 10 ppm, and in one embodiment up to about 5 ppm, and in one embodiment up to about 2 ppm. In one embodiment, the free chloride ion concentration is less than about 1 ppm, and in one embodiment less than about 0.5 ppm, or less than about 0.2 ppm, or less than about 0.1 ppm, and in one embodiment it is zero or substantially zero. The impurity level is generally at a level of no more than about 20 grams per liter, and in one embodiment it is up to about 10 grams per liter. The current density is generally in the range of about 20 to about 300 amps per square foot, and in one embodiment about 30 to about 200 amps per square foot.

During electrodeposition one or more addition agents can be added to the electrolyte solution to alter the copper metal powder characteristics. These include gelatins derived from collagen, an example of which is animal glue. In one embodiment, chloride ions can be added to increase the dendritic character of the powder particles and to increase the yield of fine powder. Sodium sulfate can be added to reduce cathode current density. Increased amounts of sodium sulfate tend to reduce particle size of the powder. Sulfonates can be added to the electrolyte to provide for a more coarse particle size. Examples of such sulfonates include Orzan-A (a product of Tembind identified as ammonium lignosulfonate). These addition agents are typically added to the electrolyte solutions at concentration levels of up to about 20 grams per liter, more preferably up to about 10 grams per liter.

In one embodiment, the electrolyte solution contains one or more active sulfur-containing materials. The term "active-sulfur containing material" refers to materials characterized generally as containing a bivalent sulfur atom both bonds of which are directly connected to a carbon atom together with one or more nitrogen atoms also directly connected to the carbon atom. In this group of compounds the double bond may in some cases exist or alternate between the sulfur or nitrogen atom and the carbon atom. Thiourea is a useful active sulfur-containing material. The thioureas having the nucleus and the iso-thiocyanates having the grouping S=C=N— are useful. Thiosinamine (allyl thiourea) and thiosemicarbazide are also useful. The active sulfur-containing material should be soluble in the electrolyte solution and be compatible with the other constituents. The concentration of active sulfur-containing material in the electrolyte solution during electrodeposition is generally up to about 20 ppm, and in one embodiment in the range of up to about 10 ppm.

In one embodiment, the electrolyte solution contains at least one triazole. The addition of such triazoles reduces the dendritic nature of the copper powder that is produced resulting in the formation of more rounded and compact powder particles. These particles are characterized by higher densities (e.g., in excess of about 2 gms/cc.) and higher flow rates when compared to copper powder particles made by conventional techniques. The triazoles that are useful include benzotriazole and substituted benzotriazoles. Examples of suitable compounds are benzotriazole, alkyl-substituted benzotriazole (e.g., tolyltriazole, ethylbenzotriazole, hexylbenzotriazole, octylbenzotriazoles, etc.) aryl-substituted benzotriazole (e.g., phenylbenzotriazoles, etc.), and alkaryl- or arylalk-substituted benzotriazole, and substituted benzotriazoles wherein the substituents may be, for example, hydroxy, mercapto, alkoxy, halo (e.g., chloro), nitro, carboxy or carbalkoxy. The alkylbenzotriazoles include those in which the alkyl group contains 1 to about 20 carbon atoms, and in one embodiment 1 to about 8 carbon atoms. Benzotriazole, tolyltriazole, and carboxy substituted benzotriazole are useful, with benzotriazole being especially useful. The concentration of these triazoles in the electrolyte solution is, in one embodiment, up to about 500 ppm, and in one embodiment from about 1 to about 250 ppm, and in one embodiment from about 10 to about 150 ppm, and in one embodiment from about 25 to about 100 ppm.

During the electrodeposition step (F), it is preferred to maintain the ratio of applied current density (I) to diffusion limited current density ($I_L$) at a level of about 0.8 or greater, and in one embodiment about 0.9 or greater. That is, $I/I_L$ is preferably about 0.8 or greater, and in one embodiment about 0.9 or greater.

In one embodiment the following parameter values are useful in electrodepositing copper powder:

| Parameter | Value |
| --- | --- |
| I (A/cm$^2$) | 0.060 |
| n (eq/mole) | 2 |
| D (cm$^2$/s) | $1.6 \times 10^{-5}$ |
| C.° (mole/cm$^3$,Cu$^{+2}$ (as CuSO$_4$)) | $1.57 \times 10^{-4}$ |
| Temperature (°C.) | 38 |
| Free sulfuric acid (g/l) | 175 |
| Kinematic Viscosity (cm$^2$/s) | 0.0126 |
| Flow velocity (cm/s) | Natural convection |

The copper metal powder can be removed from the cathode by brushing, scraping, vibration or other mechanical and/or electrical techniques known in the art. Powder can be removed by reversing the current on the cathode. Particle size can be controlled by controlling the length of the interval between powder removal with powder becoming coarser as the interval is increased. Also, the apparent density increases as the length of the interval is extended.

In one embodiment, a series of disc-shaped rotating cathodes are used which are partially submerged in the electrolyte solution. Cathodes of this type are disclosed, for example, in U.S. Pat. No. 3,616,277, which is incorporated herein by reference for its disclosure of such disc-shaped cathodes. Copper powder is deposited on the disc-shaped cathodes as they rotate through the electrolyte solution. The cathodes, which can be made, for example, of titanium and insoluble anodes (e.g., platinized titanium) are positioned in the electrolytic cell in interleaved arrangement with the cathodes. Powder is continuously deposited on the cathodes and continuously removed by doctor blades, which can be made of plastic or stainless steel and are mounted adjacent the cathodes above the electrolyte level of the cell.

In one embodiment the copper metal powder that is removed during (G) of the inventive process is washed sufficiently to remove electrolyte which can cause the powder to oxidize. Various methods can be employed to wash the powder. One method involves centrifuging the powder to remove the electrolyte, washing the powder and then dewatering the powder.

In one embodiment, the copper metal powder is transferred into a large tank and water is added to produce a slurry that is pumped into a filter. In the filter, the powder is dewatered, washed several times, and again dewatered. During this process stabilizers can be added to reduce oxidation. Examples of such stabilizers include aqueous solutions of gelatin (e.g., animal glue). The addition of antioxidants during washing or subsequent powder treatment also protects the powder from oxidation. Examples of these antioxidants include one or more of the triazoles discussed above, with benzotriazole being useful.

After washing and dewatering, the wet powder can be subjected to heat treatments which tends to alter certain properties of the copper metal powder, particularly particle size and shape, apparent density, and green strength. In one embodiment, the powder is heat treated on a mesh belt electric furnace. To prevent the powder from falling through the belt, a continuous sheet of high wet-strength paper is fed to the belt, and then the powder is transferred to the paper. A roller compresses the powder to improve heat transfer. As it enters the furnace, water is driven off and the paper burns--but not before the powder has sintered sufficiently to prevent it from falling through the belt. The furnace atmosphere is produced in exothermic gas units in which natural gas and air are blended to yield an atmosphere containing, for example, about 17% hydrogen, about 12% CO, about 4% $CO_2$, with the balance being nitrogen. The gas is advanced through a cooler to the furnace. In the cooler, the gas is cooled (e.g., to about −22° C. to about −40° C.), and water from the gas is condensed, thus lowering the dew point. The gas enters the furnace from the discharge end and, because it is cooled, aids in cooling the powder cake. The furnace operation dries the powder, alters the particle shape, reduces the oxides, and sinters the fines. The discharge temperature is sufficiently low to prevent reoxidation of the powder cake. By varying the furnace temperature between about 250° C. to about 900° C., and in one embodiment about 370° C. and about 650° C. and altering the time of exposure, change can be made in the content of fines, apparent density, and dimensional characteristics. Upon completion of the heat treating operation, the resulting powder cake is broken and is ready for milling.

Milling can be performed, for example, in a high-speed, water-cooled hammer mill in which feed rate, mill speed, and screen openings under the mill can be varied to obtain the powder characteristics desired. The powder leaving the mill can be fed to screens where it is separated into particle size fractions. The −100 mesh powder can be classified in an air classifier and the fines can be blended in with the final powder product. Oversize material can be returned to the mill for additional milling. Alternatively, either or both undersized and oversized particles can be combined with the first electrolyte solution separated during (E). The copper metal powders produced during the milling and classifying operations can be stored in drums to which a drying agent such as silica gel or camphor can be added to prevent or reduce oxidation.

In one embodiment, the wet powder, after washing and dewatering, is heat treated in a reducing atmosphere at a temperature below about 375° C., and in one embodiment below about 325° C., and in one embodiment in the range of about 150° C. to about 375° C., and in one embodiment in the range of about 175° C. to about 325 C. The reducing atmosphere can be hydrogen, a mixture of hydrogen and nitrogen, disassociated ammonia, carbon monoxide, exothermic reform gas, endothermic reform gas, and the like. Exothermic reform gas and endothermic reform gas are especially useful. By operating under these conditions the formation of sinter cake is reduced or eliminated, and the subsequent steps of sintering and milling that are usually required can be eliminated.

In one embodiment, the copper powder is combined with an oxide of a reactive element selected from the group consisting of aluminum, silicon, beryllium, magnesium, thorium, zirconium or yttrium, with aluminum being preferred, to form a dispersion-strengthened copper. This can be done using any of the known techniques for forming dispersion-strengthened copper including simple mechanical mixing of the copper powder with particulates of the oxide of the reactive element, mechanical alloying using high energy milling, and selective internal oxidation of the reactive element from a dilute solid-solution alloy. The dispersion strengthened copper generally contains up to about 3% by weight of the reactive element, and in one embodiment up to about 2% by weight, and in one embodiment from about 0.1 to about 1.5% by weight. In one embodiment, the dispersion strengthened copper is comprised of a fine, uniform dispersion of oxide particles of the reactive element (e.g., aluminum oxide) in a copper matrix, the particles ranging in size from about 30 to about 120 angstroms, with inter-particle spacing ranging from about 500 to about 1000 angstroms. The reactive element oxide particles are hard and thermally stable at high temperatures and retain their original particle size and inter-particulate spacing even at temperatures approaching the melting point of copper. The dispersion-strengthened copper offers a unique combination of high strength and high electrical and thermal conductivities. These materials also have the ability to retain most of these properties after prolonged exposure to temperatures approaching the melting point of the copper matrix, thus extending considerably the useful temperature range of copper. These characteristics also enable fabrication of parts by high temperature joining processes, such as brazing, without losing strength. They can also be used in applications involving high operating temperatures.

The properties of copper articles produced by the inventive process are dependent on various characteristics of the operation and, therefore, can often be controlled by altering certain process variables. For example, purity can be high, with copper contents that can exceed, for example, about 99.5% by weight or about 99.9% by weight, if such high purity levels are required. In this regard, an advantage of the inventive process is that the purity level of stripping solution or electrolyte that is used in step (F) can be controlled, and the organic materials carried over into the electrolyte from the upstream contacting steps generally do not have a negative impact on the properties of the copper articles that are produced. It is also possible to produce copper articles with lower purity levels, for example, as low as 95% by weight copper, or as low as 97% by weight copper, or as low as 99% by weight copper, if economics and the requirements for the copper article that is produced permit such lower levels of copper purity.

Particle size distribution for the copper powder can be selected to meet the requirements for making the shaped copper articles and can be varied over a wide range. For example, the −325 mesh fraction can be varied from about 5% to about 90% by weight. Apparent densities of the powder can be in the range of, for example, about 0.5 to about 4 g/cm$^3$, and in one embodiment about 1 to about 3 g/cm$^3$. Typical flow rates range from about 10 to about 75 seconds for a 50-gram sample, and in one embodiment about 20 to about 65 seconds.

Green density is a function of the compacting pressure. For example, the green density can rise from 7 to about 8 g/cm$^3$ as the compacting pressure is increased from about 20 to about 40 tons per square inch (tsi). Green strength increases with the compacting pressure. For example, the green strength can rise from less than about 2200 psi up to about 3500 psi as the compacting pressure is increased from about 20 to about 40 tsi. Particle shape of the copper metal powder is generally dendritic when deposited on the cathode. During subsequent operations, however, the dendrites tend to become rounded.

During step (H), the copper powder is extruded through a die, forged or molded to form the desired shaped copper article. In one embodiment, the copper powder is friction extruded using a machined rotating drum and a shaped feed slot to produce an elongated article with a desired cross-sectional shape and size. In this embodiment, friction is generated in the drum to compact the powder and thereby form the copper article. In one embodiment, the cross section of the article has a diameter or major dimension of up to about 6 inches, and in one embodiment about 0.2 to about 3 inches. In one embodiment, the shaped article is drawn or rolled to modify its shape or size. For example, the shaped article can be rolled using one or a series of Turks head mills to provide the desired shape and size. The shaped article can be drawn using reduction dies to provide extruded products with desired cross sectional shapes and sizes.

Generally, the copper articles produced in accordance with the inventive process can have any shape. These include the shapes illustrated in FIGS. 2–29, 33–36 which are cross sections of elongated extruded copper articles. The copper articles can have structural and/or decorative applications. Copper tubing and copper pipe (e.g., seamless pipe and tubing, finned tubes, etc.) of any diameter and wall thickness can be made. Pipe and tube fittings such as bends, elbows, tees, reducers, joints, supports, and the like can be made. Copper articles such as washers, valve parts, radiator fins, and the like can be made. Electrical and electronic parts and components such as connectors, bars, and the like can be made. Intermediate shaped articles that are subsequently subjected to further shaping techniques to provide the final desired product can be made.

Figure 12:
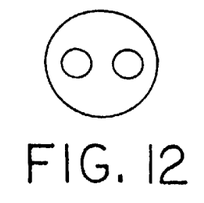
Figure 13:
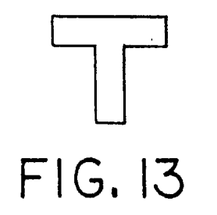
Figure 14:
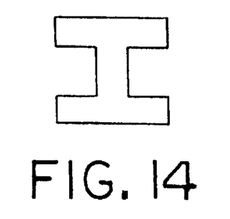
Figure 15:
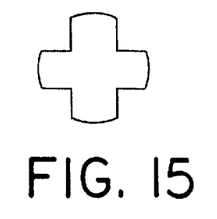
Figure 16:
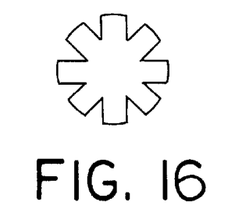
Figure 17:
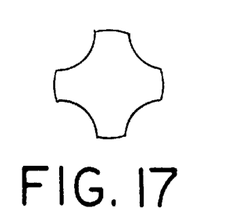
Figure 18:
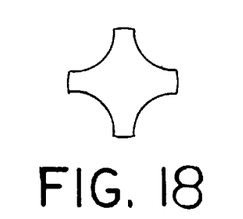
Figure 19:
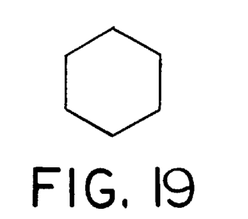
Figure 20:
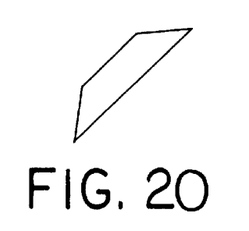
Figure 21:
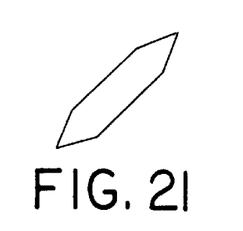
Figure 22:
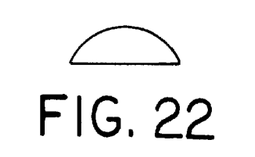
Figure 23:
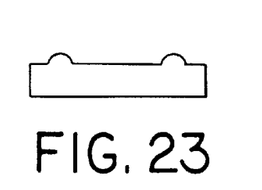
Figure 24:
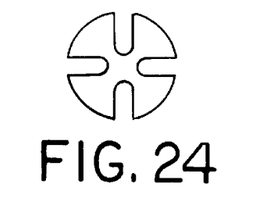
Figure 25:
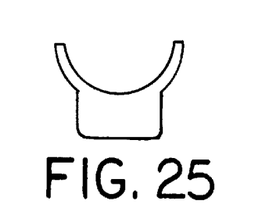
Figure 26:
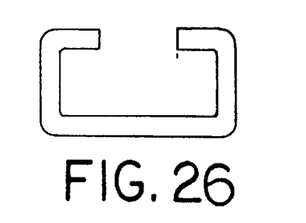
Figure 27:
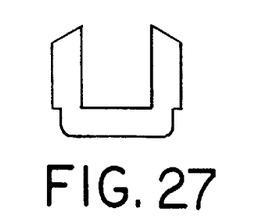
Figure 28:
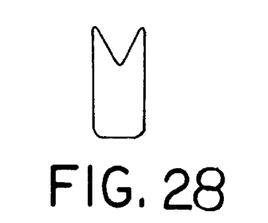
Figure 29:
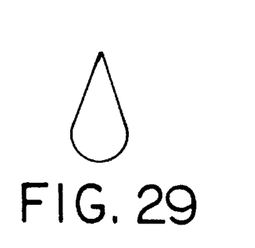
Figure 34:
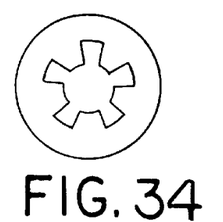
Figure 35:
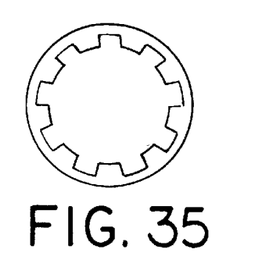
Figure 36:
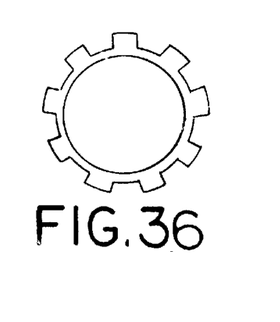

The articles that can be made include pipes and tubes (FIGS. 2, 35 and 36), as well as circular rods and cylinders with or without one or more holes, bores or cavities in or through their interior (FIGS. 12 and 34). They also include elongated extruded articles having cross-sections in the shape of semi-circles (FIG. 22), squares (FIGS. 4 and 6), rectangles (FIG. 3), race tracks (FIG. 5), flats (FIG. 7), L's (FIG. 8), U's (FIGS. 9, 26, 27), T's (FIG. 13), I's (FIG. 14), polygons (FIGS. 10, 11, 19, 20, 21), crosses (FIGS. 15, 17, 18, 24 and 33), stars (FIG. 16), ribbed flats (FIG. 23). The shaped articles can have solid cross sections or interiors, or they can have one or more holes, bores or cavities in or through them (e.g., FIGS. 2, 12, and 33–36). These articles can have sharp edges (e.g., FIG. 4) or rounded edges (e.g., FIG. 6).

Figure 30:
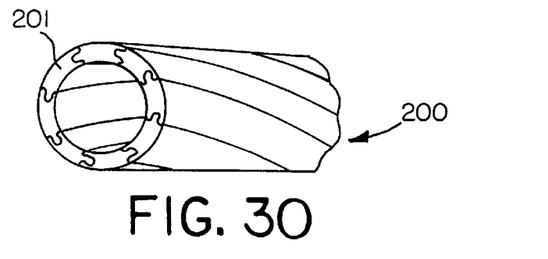
FIG. 30 illustrates a pipe or tube assembly made of individual interlocking components that can be made in accordance with the invention.
Figure 31:
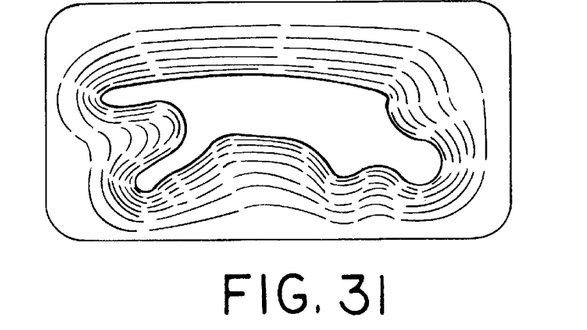
FIGS. 31 and 32 illustrate extrusion dies that can be used to make the interlocking components of the pipe or tube assembly illustrated in FIG. 30.
Figure 32:
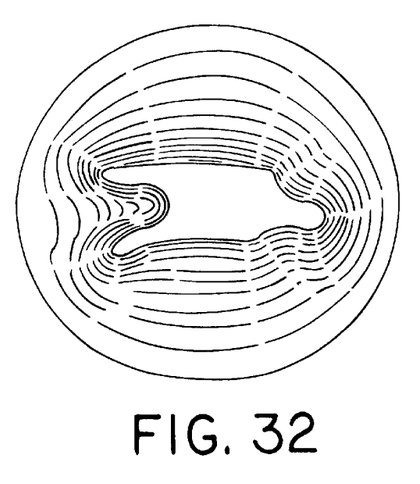
Figure 33:
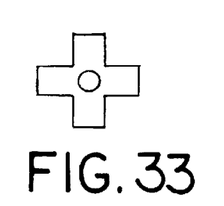

In one embodiment, the pipe or tube 200 illustrated in FIG. 30, which consists of an assembly of individual interlocking tube or pipe components 201, can be made using the inventive process. The individual interlocking components 201 can be extruded using the dies illustrated in FIGS. 31 and 32.

In one embodiment, the copper powder is in the form of a dispersion-strengthened copper powder, and the shaped copper articles made therefrom include resistance welding electrodes, lead wires for incandescent lamps, commutators for helicopter motors, relay blades and contact supports that are current carrying arms that move between the fixed contact points to make or break an electrical circuit, continuous casting molds, side dam blocks for Hazelett casting machines, gas metal arc welding tips, seam welding wheels, high current welding cables, microwave tube components, electrical connectors, and the like.

In one embodiment, the shaped articles that are produced are cleaned using known chemical, electropolishing or mechanical techniques. Chemical cleaning can be effected by passing the article through an etching or pickling bath of nitric acid or hot (e.g., about 25° C. to 70° C.) sulfuric acid. Electropolishing can be effected using an electric current and sulfuric acid. Mechanical cleaning can be effected using brushes and the like for removing burrs and similar roughened portions from the surface of the article. In one embodiment, the article is degreased using a caustic soda solution, washed, rinsed, picketed using hot (e.g., about 35° C.) sulfuric acid, electropolished using sulfuric acid, rinsed and dried.

Figure 1:
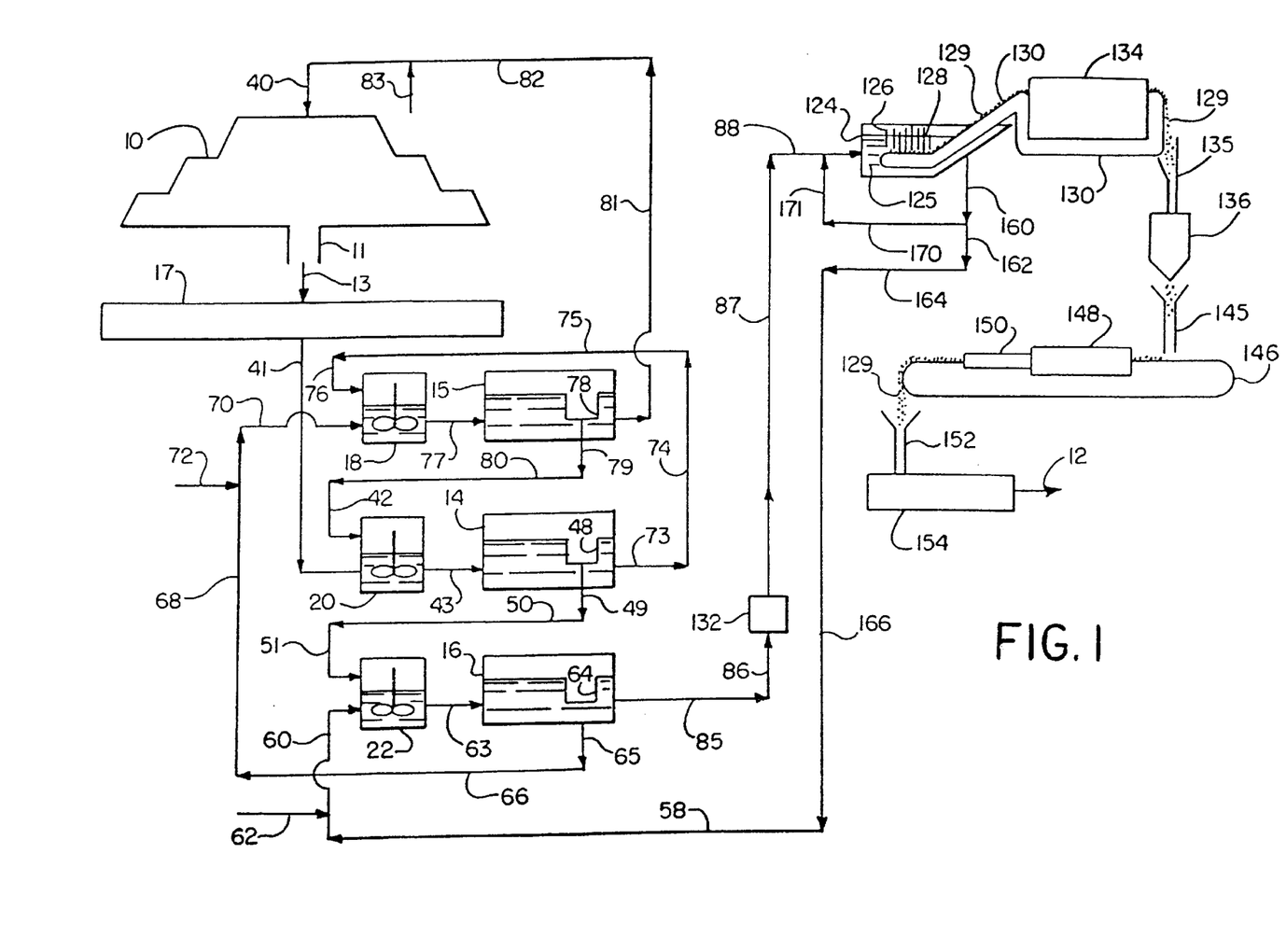
FIG. 1 is a flow sheet illustrating one embodiment of the invention wherein copper is extracted from copper ore, electrodeposited to form copper powder, and the copper powder is extruded to form a shaped copper article.
Figure 2:
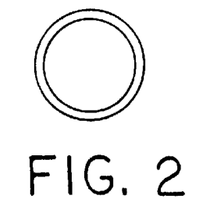
FIGS. 2–29, 33–36 illustrate cross sections of elongated extruded copper articles made in accordance with the invention.
Figure 3:
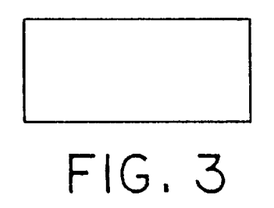
Figure 4:
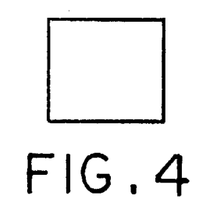
Figure 5:
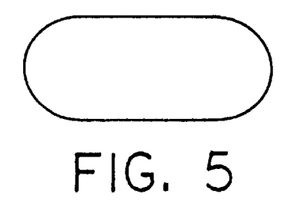
Figure 6:
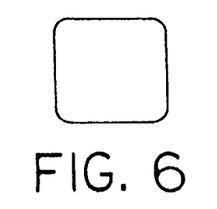
Figure 7:
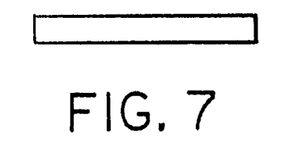
Figure 8:
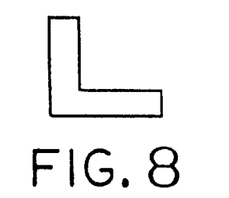
Figure 9:
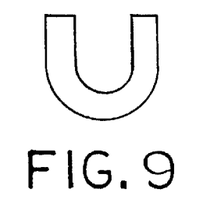
Figure 10:
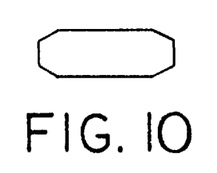
Figure 11:
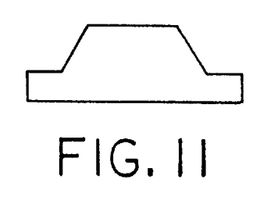

Referring now to FIG. 1, copper is extracted from leach dump 10 and treated in accordance with the inventive process to produce extruded copper article 12. In this embodiment, the process involves the use of settlers 14, 15 and 16, collection pond 17, mixers 18, 20 and 22, electrolytic cell 124 which includes interleaved cathodes 126 and insoluble anodes 128, endless belts 130 and 146, filter 132, rinse and dewater unit 134, storage hopper 136, powder spreading weir 145, furnace 148, cooling chamber 150, sinter cake breaker 152, and extruder 154. In this embodiment, step (A) of the inventive process is conducted at the leach dump 10. Steps (B) and (C) are conducted in two stages using mixers 18 and 20 and settlers 14 and 15. Steps (D) and (E) are conducted using mixer 22 and settler 16. Steps (F) and (G) are conducted using electrolytic cell 124 and belt 130. Step (H) is conducted using extruder 154.

Aqueous leach solution from line 40 is sprayed onto the surface of the leach dump 10. The leach solution is a sulfuric acid solution having a sulfuric acid concentration generally in the range of about 5 to about 50, and in one embodiment about 5 to about 40 grams per liter, and in one embodiment about 10 to about 30 grams per liter. The leach solution percolates down through the dump, dissolves copper in the ore, flows through the dump space 11 as a copper-rich aqueous leach solution (sometimes referred to as a pregnant leach solution), flows through line 13 into collection pond 17 and from there is pumped through line 41 into mixer 20. The copper-rich aqueous leach solution that is pumped into mixer 20 generally has a copper ion concentration in the range of about 0.8 to about 5 grams per liter, and in one embodiment about 1 to about 3 grams per liter; and a free sulfuric acid concentration generally in the range of about 5 to about 30 grams per liter, and in one embodiment about 10 to about 20 grams per liter. In mixer 20, the copper-rich aqueous leach solution is mixed with a copper-bearing organic solution which is pumped into mixer 20 from weir 78 of settler 15 through lines 79, 80 and 42. The concentration of copper in the copper-bearing organic solution that is added to mixer 20 is generally from about 0.5 to about 4 grams per liter of extractant in the organic solution, and in one embodiment about 1 to about 2.4 grams per liter of extractant in the organic solution. During the mixing in mixer 20 an organic phase and an aqueous phase form and intermix. Copper ions transfer from the aqueous phase to the organic phase. The mixture is pumped from mixer 20 through line 43 to settler 14. In settler 14, the aqueous phase and organic phase separate with the organic phase forming the top layer and the aqueous phase forming the bottom layer. The organic phase collects in weir 48 and is pumped through lines 49, 50 and 51 to mixer 22. This organic phase is a copper-rich organic solution (which can be referred to as a loaded organic). This copper-rich organic solution generally has a copper concentration in the range of about 1 to about 6 grams per liter of extractant in the organic solution, and in one embodiment about 2 to about 4 grams per liter of extractant in the organic solution.

The copper-rich organic solution is mixed in mixer 22 with a copper-depleted stripping solution. The copper-depleted stripping solution (which can be referred to as a lean electrolyte) is produced in the electrolytic cell 124 and is pumped through lines 160, 162, 164, 166, 58 and 60 to mixer 22. This copper-depleted stripping solution has a free sulfuric acid concentration generally in the range of about 80 to about 300 grams per liter, and in one embodiment about 150 to about 250 grams per liter; and a copper ion concentration generally in the range of about 1 to about 50 grams per liter, and in one embodiment about 4 to about 12 grams per liter. Fresh stripping solution make-up can be added to line 60 through line 62. The copper-rich organic solution and copper-depleted stripping solution are mixed in mixer 22 with the result being the formation of an organic phase intermixed with an aqueous phase. Copper ions transfer from the aqueous phase to the organic phase. The mixture is pumped from mixer 22 through line 63 to settler 16. In settler 16, the organic phase separates from the aqueous phase with the organic phase collecting in weir 64. This organic phase is a copper-depleted organic solution (which is sometimes referred to as a barren organic). This copper-depleted organic solution has a copper concentration generally in the range of about 0.5 to about 2 grams per liter of extractant in the organic solution, and in one embodiment about 0.9 to about 1.5 grams per liter of extractant in the organic solution. The copper depleted organic solution is pumped from settler 16 through lines 65, 66, 68 and 70 to mixer 18. Fresh organic solution make-up can be added to line 70 through line 72.

Copper-containing aqueous leach solution is pumped from settler 14 through lines 73, 74, 75 and 76 to mixer 18. This copper-containing aqueous leach solution generally has a copper ion concentration in the range of about 0.4 to about 4 grams per liter, and in one embodiment about 0.5 to about 2.4 grams per liter; and a free sulfuric acid concentration generally in the range of about 5 to about 50 grams per liter, and in one embodiment about 5 to about 30 grams per liter, and in one embodiment about 10 to about 20 grams per liter. In mixer 18, an organic phase and aqueous phase form, intermix and copper ions transfer from the aqueous phase to the organic phase. The mixture is pumped through line 77 to settler 15. In settler 15, the organic phase separates from the aqueous phase with the organic phase collecting in weir 78. This organic phase, which is a copper-containing organic solution, is pumped from settler 15 through lines 79, 80 and 42 to mixer 20. This copper-containing organic solution has a copper concentration generally in the range of about 0.5 to about 4 grams per liter of extractant in the organic solution, and in one embodiment about 1 to about 2.4 grams per liter of extractant in the organic solution. The aqueous phase in settler 15 is a copper-depleted aqueous leaching solution which is pumped through lines 81 and 82 to line 40 wherein it is sprayed over the leach dump 10. Fresh leaching solution make-up can be added to line 82 through line 83.

The aqueous phase which separates out in settler 16 is a copper-rich stripping solution. It is pumped from settler 16 through lines 85 and 86 to filter 132 and from filter 132 through lines 87 and 88 to electrolytic cell 124. This copper-rich stripping solution has a copper ion concentration generally in the range of about 1 to about 60 grams per liter, and in one embodiment about 5 to about 15 grams per liter; and a free sulfuric acid concentration generally in the range of about 70 to about 290 grams per liter, and in one embodiment about 140 to about 240 grams per liter. The copper-rich stripping solution entering electrolytic cell 124 can be referred to as an electrolyte solution 125.

Electrolyte solution 125 has a copper ion concentration generally in the range of about 1 to about 60 grams per liter, and in one embodiment about 4 to about 15 grams per liter; and a free sulfuric acid concentration generally in the range of about 70 to about 300, and in one embodiment about 140 to about 250 grams per liter. The electrolyte solution 125 flows by natural convection between interleaved cathodes 126 and anodes 128. When voltage is applied between the anodes 128 and cathodes 126, electrodeposition of copper metal powder occurs on the cathodes. The electrodeposited copper powder 129 is removed from the cathodes 126 using a mechanical scraper (not shown in the drawing) and is conveyed along endless belt 130 to rinse and dewater unit 134.

The electrolyte solution 125 is converted to a copper-depleted electrolyte solution in electrolytic cell 124 and is withdrawn from cell 124 through line 160. The copper-depleted electrolyte solution in line 160 has a copper ion concentration generally in the range of about 1 to about 50 grams per liter, and in one embodiment about 4 to about 12 grams per liter; and a free sulfuric acid concentration generally in the range of about 80 to about 300, and in one embodiment about 150 to about 250 grams per liter. This copper-depleted electrolyte is either: (1) recirculated through lines 160, 170, 171 and 88 back to cell 124; or (2) pumped through lines 160, 162, 164, 166, 58 and 60 to mixer 22 as the copper-depleted stripping solution.

Copper metal powder 129 is conveyed from electrolytic cell 124 to rinse and dewater unit 134 along endless belt 130. The powder 129 is rinsed and dewatered in unit 134. Rinse and dewater unit 134 can be, for example, a vacuum belt filter equipped with overhead spray nozzles for spraying the powder with water. The powder 129 is conveyed from unit 134 along endless belt 130 to chute 135 and into storage hopper 136. The powder 129 is conveyed from storage hopper 136 through powder spreading weir 145 to endless belt 146. The powder 129 is spread on endless belt 146 and advanced through furnace 148 and cooling chamber 150 where it is dried and sintered to form a sinter cake. During this drying and sintering step, oxides that are picked up in the rinsing and dewatering unit 134 are reduced or eliminated. The sinter cake is conveyed from cooling chamber 150 along endless belt 146 to sinter cake breaker 152 and then advanced to extruder 154. The broken sinter cake is extruded in extruder 154 to form the desired shaped copper article.

Although the embodiment depicted in FIG. 1 employs two-stage solvent extraction steps using mixers 18 and 20 and settlers 14 and 15, it is to be understood that additional extraction stages can be added to the process without departing from the essence of the invention. Thus, for example, while FIG. 1 specifically discloses a two-stage extraction step, and the foregoing discussion refers to single-stage and two-stage extractions, the inventive process can be conducted using a three-stage, four-stage, five-stage, six-stage, etc., extraction step. Similarly, although the embodiments depicted in FIG. 1 uses a single-stage stripping step using mixer 22 and settler 16, it is to be understood that additional stripping stages can be added to the process without departing from the essence of the invention. Thus, for example, the inventive process can be conducted using a two-stage, three-stage, four-stage, five-stage, six-stage, etc., stripping step.

The following examples are provided for purposes of illustrating the invention. Unless otherwise indicated, in the following examples as well as throughout the specification and claims, all parts and percentages are by weight, all temperatures are in degrees Celsius, and all pressures are atmospheric.

EXAMPLE 1

Copper tubing is prepared using the process illustrated in FIG. 1. The aqueous leaching solution sprayed onto the leach dump 10 from line 40 is an aqueous sulfuric acid solution having a free sulfuric acid concentration of 20 grams per liter. The copper-rich aqueous leach solution that is pumped to mixer 20 through line 41 has a copper ion concentration of 1.8 grams per liter and a free sulfuric acid concentration of 12 grams per liter. The organic solution is a 7% by weight solution of LIX 984 in SX-7. The concentration of copper in the copper-bearing organic solution that is added to mixer 20 from settler 15 has a copper concentration of 1.95 grams per liter of LIX 984 in the organic solution. The copper-rich organic solution that is pumped to mixer 22 from settler 14 has a copper concentration of 3 grams per liter of LIX 984 in the organic solution. The copper-depleted stripping solution added to mixer 22 from line 60 has a free sulfuric acid concentration of 170 grams per liter and a copper ion concentration of 40 grams per liter. The copper-depleted organic solution that is pumped from settler 16 to mixer 18 has a copper concentration of 1.25 grams per liter of LIX 984 in the organic solution. The copper-containing aqueous leach solution pumped from settler 14 to mixer 18 has a copper ion concentration of 0.8 grams per liter and a free sulfuric acid concentration of 12 grams per liter. The copper-depleted aqueous solution pumped from settler 15 through line 81 has a copper concentration of 0.15 grams per liter and a free sulfuric acid concentration of 12 grams per liter. The copper-rich stripping solution taken from settler 16 for use in the electrolytic cell is diluted with water and sulfuric acid to provide a copper ion concentration of 8 grams per liter and free sulfuric acid concentration of 145 grams per liter. The current density in the electrolytic cell 124 is 100 amps per square foot, and the temperature is 50° C. The insoluble anodes are made of titanium and coated with iridium, and the cathodes are made of stainless steel. Electrodeposition is conducted in the electrolytic cell for a cycle of 120 minutes. At the end of the cycle, the cathode is scraped using a stainless steel scraper. The copper metal powder is collected in a stainless steel container. The powder is rinsed using deionized water and then the water is decanted. This rinse procedure is repeated four more times. The powder is dried and deoxidized at 400° C. for 90 minutes under a hydrogen atmosphere. The powder is extruded through a die to form a copper tube having a round cross-section, an outside diameter of ⅜ inch, and a wall thickness of ​1/16​ inch.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for making a shaped copper article directly from a copper-bearing material, comprising:

(A) contacting said copper-bearing material with an effective amount of at least one aqueous leaching solution to dissolve copper ions into said leaching solution and form a copper-rich aqueous leaching solution;

(B) contacting said copper-rich aqueous leaching solution with an effective amount of at least one water-insoluble extractant to transfer copper ions from said copper-rich aqueous leaching solution to said extractant to form a copper-rich extractant and a copper-depleted aqueous leaching solution;

(C) separating said copper-rich extractant from said copper-depleted aqueous leaching solution;

(D) contacting said copper-rich extractant with an effective amount of at least one aqueous stripping solution to transfer copper ions from said extractant to said stripping solution to form a copper-rich stripping solution and a copper-depleted extractant;

(E) separating said copper-rich stripping solution from said copper-depleted extractant;

(F) flowing said copper-rich stripping solution between an anode and a cathode, and applying an effective amount of voltage across said anode and said cathode to deposit copper powder on said cathode;

(G) removing said copper powder from said cathode; and (H) extruding, forging or molding said copper powder to form said shaped copper article.

2. The process of claim 1 wherein said shaped article from (H) is drawn or rolled to modify its shape or size.

3. The process of claim 1 wherein said copper-bearing material is copper ore, copper concentrate, copper smelter products, smelter flue dust, copper cement, copper sulfate or copper-containing waste.

4. The process of claim 1 with the step of separating said copper-rich aqueous solution formed in (A) from said copper-bearing material.

5. The process of claim 1 wherein said aqueous leaching solution comprises sulfuric acid, halide acid or ammonia.

6. The process of claim 1 wherein said extractant in (B) is dissolved in an organic solvent selected from the group consisting of kerosene, benzene, naphthalene, fuel oil and diesel fuel.

7. The process of claim 1 wherein said extractant in (B) comprises at least one compound represented by the formula wherein $R^1$, $R^2$, $R^3$, $R^4$, $R^5$, $R^6$ and $R^7$ are independently hydrogen or hydrocarbyl groups.

8. The process of claim 1 wherein said extractant in (B) comprises at least one compound represented by the formula wherein R¹ and R² are independently hydrogen or hydrocarbyl groups.

9. The process of claim 1 wherein said extractant in (B) comprises at least one compound represented by the formula wherein R¹ and R² are independently alkyl groups or aryl groups.

10. The process of claim 1 wherein said extractant in (B) comprises at least one ion exchange resin.

11. The process of claim 10 wherein said ion exchange resin is a copolymer of styrene and divinylbenzene characterized by the presence of at least one functional group selected from —SO₃—, —COO—, and 12. The process of claim 10 wherein said ion exchange resin is a copolymer of styrene and divinylbenzene.

13. The process of claim 1 wherein said stripping solution comprises sulfuric acid.

14. The process of claim 1 wherein during (F) said copper-rich stripping solution has a copper ion concentration in the range of about 1 to about 60 grams per liter and a free sulfuric acid concentration in the range of about 70 to about 300 grams per liter.

15. The process of claim 1 wherein during (F) at least one additive selected from the group consisting of gelatin, chloride ions, sodium sulfate, and sulfonate is added to said copper-rich stripping solution.

16. The process of claim 1 wherein said stripping solution in step (F) is characterized by the presence of at least one active-sulfur containing material.

17. The process of claim 1 wherein said stripping solution in step (F) is characterized by the presence of at least one triazole.

18. The process of claim 1 wherein said stripping solution in step (F) is characterized by the presence of benzotriazole.

19. The process of claim 1 wherein said anode in step (F) is a dimensionally stable insoluble anode.

20. The process of claim 1 wherein said anode in step (F) is a titanium anode that is coated with a platinum family metal or metal oxide.

21. The process of claim 1 wherein the concentration of free chloride ions in said stripping solution in step (F) is up to about 20 ppm.

22. The process of claim 1 wherein during (F) the concentration of free chloride ions in said stripping solution is less than about 1 ppm.

23. The process of claim 1 wherein during step (H) said copper powder is extruded through a die to form said copper article.

24. The process of claim 1 wherein during step (H) said copper powder is forged to form said copper article.

25. The process of claim 1 wherein during step (H) said copper powder is molded to form said copper article.

26. The process of claim 1 wherein prior to step (H), said copper powder is combined with the oxide of a reactive element selected from the group consisting of aluminum, silicon, beryllium, magnesium, thorium, zirconium and yttrium to form a dispersion-strengthened copper.

27. The process of claim 1 wherein said shaped article is in the form of a tube or a pipe.

28. The process of claim 1 wherein said shaped article has a cross section in the form of a circle, flat, square, rectangle, cross or polygon.

29. The process of claim 1 wherein said shaped article has a cross section substantially in the form of an L, H, I, U or T.

30. The process of claim 1 wherein said shaped article has one or more holes in or through it.

31. A process for making a shaped copper article directly from a copper-bearing material, comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to (D);

(B-2) contacting said first copper-depleted aqueous leaching solution from (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to (B-1);

(D) contacting said copper-rich extractant from (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to (B-2);

(F) advancing said first electrolyte solution to an electrolytic cell equipped with at least one anode and at least one rotating cathode, and applying an effective amount of voltage across said anode and said cathode to deposit copper powder on said cathode;

(G) removing said copper powder from said cathode; and (H) extruding, forging or molding said copper powder to form said shaped article.

32. A process for making a shaped copper article directly from a copper-bearing material, comprising:

(A) contacting said copper-bearing material with an effective amount of at least one aqueous leaching solution to dissolve copper ions in said leaching solution and form a copper-rich aqueous leaching solution;

(B-1) contacting said copper-rich aqueous leaching solution from (A) with an effective amount of at least one copper-bearing water-insoluble extractant from (C-2) to transfer copper ions from said copper-rich aqueous leaching solution to said copper-bearing extractant to form a copper-rich extractant and a first copper-depleted aqueous leaching solution;

(C-1) separating said copper-rich extractant from said first copper-depleted aqueous leaching solution, advancing said copper-rich extractant to (D);

(B-2) contacting said first copper-depleted aqueous leaching solution from (C-1) with an effective amount of at least one copper-depleted extractant from (E) to transfer copper ions from said first copper-depleted aqueous leaching solution to said copper-depleted extractant to form a copper-bearing extractant and a second copper-depleted aqueous leaching solution;

(C-2) separating said copper-bearing extractant from said second copper-depleted aqueous leaching solution, recirculating said copper-bearing extractant to (B-1);

(D) contacting said copper-rich extractant from (C-1) with an effective amount of at least one aqueous stripping solution to transfer copper ions from said copper-rich extractant to said stripping solution to form a first electrolyte solution and a copper-depleted extractant;

(E) separating said first electrolyte solution from said copper-depleted extractant, recirculating said copper-depleted extractant to (B-2);

(F) advancing said first electrolyte solution from (E) to an electrolytic cell equipped with at least one first anode and at least one cathode, and applying an effective amount of voltage across said anode and said cathode to deposit copper powder on said first cathode;

(G) removing said copper powder from said cathode;

(H-1) extruding said copper powder to form said shaped copper article; and (H-2) drawing or rolling said shaped article to modify the shape of said article.

* * * * *